3,256,741
METHOD AND APPARATUS FOR DETERMINING COMPONENTS OF DYNAMIC MODULI
Raleigh W. Wise, St. Albans, W. Va., assignor to Monsanto Company, a corporation of Delaware
Filed May 6, 1963, Ser. No. 278,133
4 Claims. (Cl. 73—432)

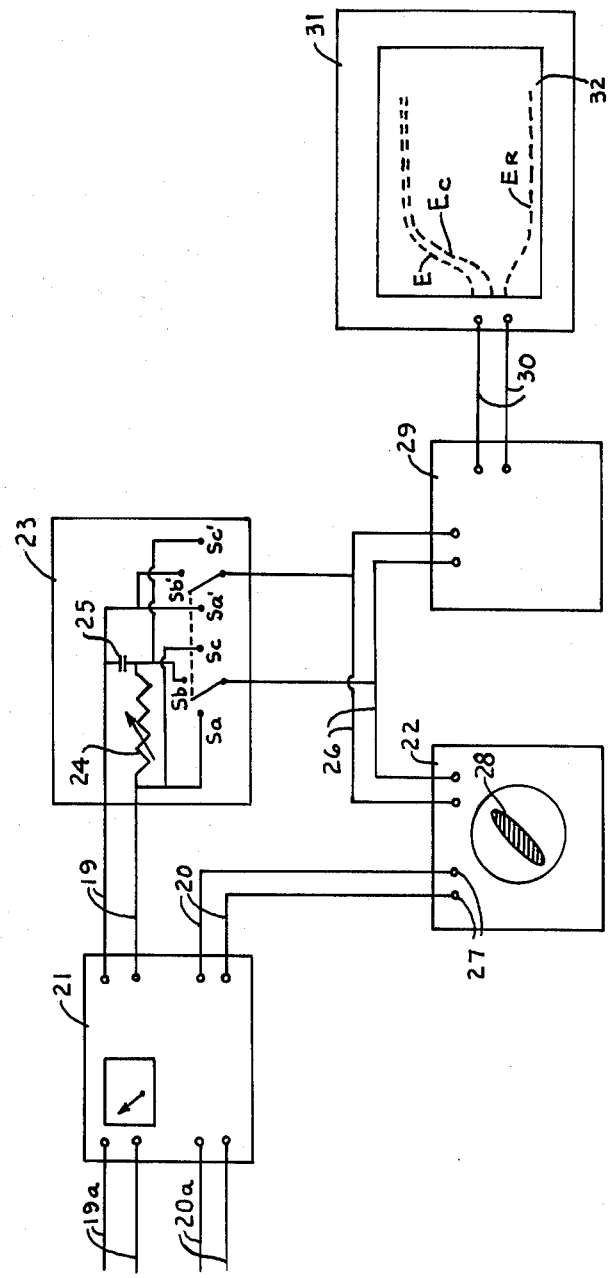

This invention relates to a viscoelasticity analog circuit and to a method for determining the in-phase and out-of-phase components of the modulus of viscoelastic materials.

An example of a viscoelastic material is rubber. Rubber is not completely elastic but possesses simultaneous elastic and viscous properties. When stress is applied it does not instantaneously take up the strain to a degree corresponding to the stress. Stain always lags slightly behind the stress and this lag becomes important for uses which depend upon dynamic properties. This phase difference known as the loss-angle may be thought of as resulting from an elastic component which obeys Hooke's law and a viscous component which obeys Newton's law. The elastic component of modulus is considered to be in-phase with the strain and the viscous component to be out-of-phase. Because of the presence of the viscous component some of the energy is dissipated in the form of heat. Heat build-up seriously degrades rubber articles and it is important to resolve the viscous and elastic components of modulus in order to predict quality of a rubber stock.

Various machines have been devised for directly measuring dynamic properties of viscoelastic materials. An important class of such machines applies sinusoidal force or deformation cycles to the rubber specimen. One of the simplest ways to determine the in-phase and out-of-phase components of the dynamic modulus is to measure both stress and strain when a sinusoidal force or deformation is applied to a viscoelastic material. Viscoelastic behavior under applied sinusoidal strain may be treated by alternating current theories to resolve the complex modulus into the two components. Such systems have provided values for the loss angle and total complex modulus from which the components of modulus may be calculated from vector analysis. Thus, it is a sufficient approximation to equate tangent of the loss angle to $$\frac{S''}{S'}$$

where $S'$ is the elastic component and $S''$ the viscous component of modulus. Although the calculations required are relatively simple, they are numerous and impose a tedious limitation. This invention provides a viscoelastic analog circuit which resolves sinusoidal stress and strain signals into the desired components without necessity for calculations.

The invention can be understood most readily by describing it in connection with a specific machine for measuring dynamic properties of viscoelastic materials. A device for measuring the complete curing characteristics and dynamic properties of elastomers during vulcanization is described in co-pending application of George E. Decker, Serial No. 231,428, filed October 18, 1962 now abandoned. The instrument comprises a forced oscillator embedded in a constant volume of plastic material under pressure. Both stress and strain are measured by appropriate transducers. The sinusoidal signals from the two transducers are fed to appropriate data presentation device. The difference in phase or loss angle is determined by varying the resistance in a calibrated resistance capacitance phase shift network located between the stress signal and an oscilloscope until the stress and strain signals are in phase as indicated by coincidence by stress and strain tracings. The real and imaginary parts of the complex dynamic modulus can then be calculated from the loss angle and the dynamic loss values in known manner. However, the present system avoids necessity for calibrating the phase shift network. The modulus and its components can be directly presented by means of an automatic recorder.

The figure shows a schematic diagram of a circuit to carry out the invention.

The operation of the present system will be apparent from the figure. A sinusoidal electrical signal from a stress transducer 19a and a sinusoidal electrical signal from a strain transducer 20a are fed to a two-channel amplifier 21. The amplified stress signal 19 is connected to a resistance capacitance phase shift network 23 comprising variable resistor 24, capacitor 25, and switching means so that voltage can be measured across the network, across the capacitor, and across the resistor. Thus, the voltage E across the network is measured at positions Sa, Sa', the voltage Ec across the capacitor at positions Sb and Sb', the voltage Er across the resistor at positions Sc and Sc'. The treated stress signal 26 from the resistance capacitance phase shift network used as a viscoelasticity analog circuit and the amplified strain signal 20 from the amplifier are connected to an oscilloscope 22. At the oscilloscope one set of terminals, as for example the vertical plate terminals, receives the treated stress signal in-put 26 and a second set, as for example the horizontal plate terminals, receives the strain signal in-put 27.

In operating the system the variable resistor is adjusted while the oscilloscope is in operation until the ellipse 28 which appears on the oscilloscope collapses to a straight line. The treated stress signal is then fed to an A.C./D.C. converter 29 and the rectified signal recorded by means of recorder 31. The resistor may conveniently be a 10,000 ohm resistor used in conjunction with a one microfarad condenser. Operating the Decker instrument at an oscillating frequency of 852 r.p.m. permits study of viscoelastic materials having phase angles over a range of approximately 0–40°.

It was formerly necessary to read the phase angle from a calibration curve calculated from the frequency, resistance and capacitance. Factors difficult to control affect the motor which controls the oscillation rate in the Decker instrument. However, the frequency does not matter over a wide range in the present viscoelasticity circuit, making the system more versatile and negating necessity of precise control of frequency. Anything within the audio frequency range would be satisfactory. Previous knowledge of the absolute values of capacitance and resistance is no longer required and necessity for calibration has been eliminated.

The sinusoidal stress signal fed to the resistance capacitance phase shift network is treated to bring it into phase with the sinusoidal strain signal by varying the resistance so that the voltage across the capacitance is in phase with the strain signal. This adjustment is made at switching position Sb, Sb', shown in the figure. The voltage may be determined by any high in-put impedance device which does not alter the resistance and capacitance characteristics of the system. An oscilloscope or phase meter is suitable for this purpose. An oscilloscope is convenient and permits visual observation of the ellipse or loop resulting from the difference in phase of the sinusoidal signals. After the required phase adjustment indicated by collapse of the ellipse into a straight line, the operator is then in position to measure the selected parameters by switching to the proper positions. A vectorial presentation of electrical analogy to viscoelasticity may be represented as follows:

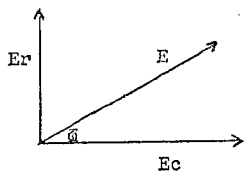

where $Er$ is the resistance across the resistor measured at position $Sc$, $Sc'$, E is the resistance across the network measured at position $Sa$, $Sa'$, and $Ec$ is the resistance across the capacitor measured at positions $Sb$ and $Sb'$. Phi corresponds to the phase angle, the tangent of which is $Er/Ec$, $Er$ corresponds to $S''$ the viscous component of the dynamic modulus, $Ec$ corresponds to $S'$ the real or elastic modulus, and E corresponds to $S*$, the total of the complex modulus. The vectorial presentation of viscoelasticity then becomes

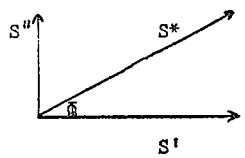

Recording the rectified signals from the analog circuit leads to a plot of the complex dynamic modulus and its components. If it is desired to know the loss angle $\Phi$ this is provided by the relationship tangent $$\Phi = \frac{S''}{S'}$$

The rectified stress signals 30 are presented to the recorder 31 which records the three rectified voltages E, $Er$ and $Ec$ which correspond to $S*$, $S''$ and $S'$. Thus, the recorder provides a graph 32 of the components of dynamic modulus and the total complex dynamic modulus. This technique allows the real and imaginary portions of the dynamic modulus to be determined with a precision of better than ±2%.

It is intended to cover all changes and modifications of the examples of the invention herein chosen for purposes of disclosure which do not constitute departures from the spirit and scope of the invention.

What is claimed is:

1. The method of treating sinusoidal electrical stress strain signals from a viscoelastic material by passing the stress signal to a resistance capacitance phase shift network used to simulate the viscoelastic properties of the material under test to convert the signals into the real and viscous components of dynamic modulus without calibration or calculation which comprises adjusting the phase shift in the stress signal until the voltage across the capacitance is in phase with the strain signal, then recurrently measuring voltage across the resistance, across the capacitance, and across both the resistance and capacitance.

2. The method of treating sinusoidal electrical stress strain signals from a viscoelastic material by passing the stress signal to a resistance capacitance phase shift network used to simulate the viscoelastic properties of the material under test to convert the signals into the real and viscous components of dynamic modulus without calibration or calculation which comprises adjusting the phase shift in the stress signal until the voltage across the capacitance is in phase with the stress signal, then recurrently measuring voltage across the resistance and capacitance, rectifying the signals and passing the rectified signals to a recorder which records the viscous and elastic components of the total dynamic modulus.

3. System for determining components of dynamic moduli of viscoelastic materials from sinusoidal electrical stress and strain signals which comprises the combination of a resistor and capacitor in series across the stress signal; switching means for recurrently connecting across both the resistor and capacitor, across the capacitor alone, and across the resistor alone; means for adjusting the phase of the electrical stress signal until the signal across the capacitor is in phase with the strain signal; means for indicating the phase null between the strain signal and the signal across the capacitor alone; and means for measuring the voltages across the aforesaid three switching positions.

4. System for determining components of dynamic moduli of viscoelastic materials from sinusoidal electrical stress and strain signals which comprises the combination of means for amplifying both the electrical stress and strain signals; means for treating the stress signal comprising in series a variable resistor for adjusting phase and capacitor connected across the stress signal; switching means for recurrently connecting across both the resistor and capacitor, across the capacitor alone and across the resistor alone; means for indicating the phase null between the strain signal and the signal across the capacitor alone; means for rectifying the treated electrical stress signals and means for measuring and presenting the rectified voltages across the aforesaid three switching positions in the form of a three-component graph.

References Cited by the Examiner

UNITED STATES PATENTS

| 2,612,774 | 10/1952 | Zenner et al. | 73—89 |
| 2,752,778 | 7/1956 | Roberts et al. | 73—60 |
| 2,948,147 | 8/1960 | Roelig et al. | 73—89 |

OTHER REFERENCES

Radar Electronic Fundamentals, TM 11-466, War Dept. (June 29, 1944), pages 222—224.

LOUIS R. PRINCE, *Primary Examiner.*

DAVID SCHONBERG, *Examiner.*

PO-1050
(5/69)

UNITED STATES PATENT OFFICE
CERTIFICATE OF CORRECTION

Patent No. 3,256,741      Dated June 21, 1966

Inventor(s) Raleigh W. Wise

It is certified that error appears in the above-identified patent and that said Letters Patent are hereby corrected as shown below:

Column 1, line 16, cancel "Stain" and in place thereof insert --Strain--.

Column 4, line 11, cancel "stress" and in place thereof insert --strain--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents